(12) United States Patent
Liu

(10) Patent No.: US 11,037,599 B2
(45) Date of Patent: Jun. 15, 2021

(54) AUTOMATIC SLOW MOTION VIDEO RECORDING

(71) Applicant: QUALCOMM Incorporated, San Diego, CA (US)

(72) Inventor: Shizhong Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/672,286

(22) Filed: Nov. 1, 2019

(65) Prior Publication Data

US 2021/0134326 A1 May 6, 2021

(51) Int. Cl.
 *H04N 19/146* (2014.01)
 *H04N 19/137* (2014.01)
 *G11B 27/00* (2006.01)

(52) U.S. Cl.
 CPC ......... *G11B 27/005* (2013.01); *H04N 19/137* (2014.11); *H04N 19/146* (2014.11)

(58) Field of Classification Search
 CPC .. G11B 27/005; H04N 19/137; H04N 19/142; H04N 19/146
 See application file for complete search history.

(56) References Cited

U.S. PATENT DOCUMENTS

| | | | | |
|---|---|---|---|---|
| 9,143,693 B1 * | 9/2015 | Zhou | ................... | H04N 5/23293 |
| 2004/0136689 A1 | 7/2004 | Oka | | |
| 2006/0056515 A1 * | 3/2006 | Kato | ..................... | H04N 19/132 |
| | | | | 375/240.16 |
| 2016/0119588 A1 * | 4/2016 | Ostby | .................... | H04N 7/183 |
| | | | | 348/143 |
| 2019/0104311 A1 | 4/2019 | Amer et al. | | |
| 2019/0132648 A1 * | 5/2019 | Zimmerman | ......... | G06F 3/0487 |
| 2020/0112701 A1 * | 4/2020 | Khandelwal | ......... | G11B 27/005 |
| 2020/0162741 A1 * | 5/2020 | Byun | ................... | H04N 19/172 |

OTHER PUBLICATIONS

International Search Report and Written Opinion—PCT/US2020/054502—ISA/EPO—dated Jan. 13, 2021.

* cited by examiner

*Primary Examiner* — Thai Q Tran
*Assistant Examiner* — Jose M Mesa
(74) *Attorney, Agent, or Firm* — Qualcomm Incorporated

(57) ABSTRACT

Systems, methods, and computer-readable media are provided for automated slow motion video recording. An example method can include storing, in a buffer, a sequence of ordered frames captured by an image sensor; sending, for display, a first frame from the sequence of ordered frames in the buffer at a time interval; calculating an amount of motion between the first frame in the buffer and a second frame in the buffer; determining, based on the amount of motion, a frame rate for encoding a set of frames from the sequence of ordered frames in the buffer, the set of frames including the second frame in the buffer and one or more frames sequentially between the first frame and the second frame; and encoding the set of frames at the frame rate determined.

28 Claims, 8 Drawing Sheets

AUTOMATIC SLOW MOTION VIDEO RECORDING

TECHNICAL FIELD

The present disclosure generally relates to automatic slow-motion video recording.

BACKGROUND

A camera is a device that captures image frames, such as still images or video frames, using an image sensor behind one or more lenses that can bend and/or focus light that passes through the one or more lenses. Cameras can include processors, such as image signal processors (ISPs), which can receive one or more image frames captured by the image sensor of the camera and process the one or more image frames. The images or videos produced by the camera can be stored on a storage, presented on a display device, and/or transmitted to a separate or remote device for storage and/or display. Moreover, videos produced by the camera can have certain effects of interest to users. One example video effect is slow motion.

BRIEF SUMMARY

In some examples, systems, methods, and computer-readable media are described for providing automatic slow-motion video recording based on adaptive frame rates. According to at least one example, a method for automatic slow-motion video recording can include storing, in a buffer, a sequence of ordered frames captured by an image sensor; sending, for display, a first frame from the sequence of ordered frames in the buffer at a time interval; calculating an amount of motion between a second frame in the buffer and the first frame in the buffer; determining, based on the amount of motion, a frame rate for encoding a set of frames from the sequence of ordered frames in the buffer, the set of frames including the second frame in the buffer and one or more frames sequentially between the first frame and the second frame; and encoding the set of frames at the frame rate determined.

In another example, an apparatus is provided for automatic slow-motion video recording. The apparatus can include a memory and one or more processors coupled to the memory, the one or more processors configured to: store, in a buffer, a sequence of ordered frames captured by an image sensor; send, for display, a first frame from the sequence of ordered frames in the buffer at a time interval; calculate an amount of motion between a second frame in the buffer and the first frame in the buffer; determine, based on the amount of motion, a frame rate for encoding a set of frames from the sequence of ordered frames in the buffer, the set of frames including the second frame in the buffer and one or more frames sequentially between the first frame and the second frame; and encode the set of frames at the frame rate determined.

In another example, a non-transitory computer-readable medium is provided for automatic slow-motion video recording. The non-transitory computer-readable medium can include instructions which, when executed by one or more processors, cause the one or more processors to store, in a buffer, a sequence of ordered frames captured by an image sensor; send, for display, a first frame from the sequence of ordered frames in the buffer at a time interval; calculate an amount of motion between a second frame in the buffer and the first frame in the buffer; determine, based on the amount of motion, a frame rate for encoding a set of frames from the sequence of ordered frames in the buffer, the set of frames including the second frame in the buffer and one or more frames sequentially between the first frame and the second frame; and encode the set of frames at the frame rate determined.

In another example, an apparatus including means for automatic slow-motion video recording is provided. The apparatus can include means for storing, in a buffer, a sequence of ordered frames captured by an image sensor; sending, for display, a first frame from the sequence of ordered frames in the buffer at a time interval; calculating an amount of motion between a second frame in the buffer and the first frame in the buffer; determining, based on the amount of motion, a frame rate for encoding a set of frames from the sequence of ordered frames in the buffer, the set of frames including the second frame in the buffer and one or more frames sequentially between the first frame and the second frame; and encoding the set of frames at the frame rate determined.

In some aspects, the method, non-transitory computer-readable medium, and apparatuses described above can include displaying the set of frames at a playback frame rate that is lower than the frame rate determined for the set of frames. In some examples, displaying the set of frames at the playback frame rate that is lower than the frame rate determined for the set of frames can include producing a slow motion effect for the set of frames based on the frame rate determined and the playback frame rate.

In some aspects, determining, based on the amount of motion, the frame rate for encoding the set of frames can include determining a first frame rate for encoding the set of frames when the amount of motion calculated is greater than a motion threshold, and determining a second frame rate for encoding the set of frames when the amount of motion calculated is less than the motion threshold, the second frame rate being lower than the first frame rate.

In some examples, the amount of motion between the first frame in the buffer and the second frame in the buffer is calculated based on a comparison of the first frame and the second frame. Moreover, in some examples, the amount of motion between the first frame in the buffer and the second frame in the buffer is calculated based on one of an optical flow technique or a block matching technique.

In some aspects, the method, non-transitory computer-readable medium, and apparatuses described above can include storing a video including the sequence of frames, the video including the set of frames encoded at the determined frame rate and at least one additional set of frames encoded at a lower frame rate than the frame rate associated with the set of frames, the lower frame rate being based on a respective motion captured in the at least one additional set of frames.

In some examples, calculating the amount of motion, determining the frame rate, and encoding the set of frames are performed while one or more new frames are being received from the image sensor and/or being stored in the frame buffer.

In some aspects, the method, non-transitory computer-readable medium, and apparatuses described above can include presenting, using a display device, a preview including the first frame and/or the second frame. In some examples, at least one or more other frames in the sequence of ordered frames are not included in the preview, and the at least one or more other frames are not presented in a different preview.

In some cases, determining the frame rate for encoding a set of frames from the sequence of ordered frames in the buffer includes determining a first frame rate when the amount of motion includes a first level of motion, determining a second frame rate when the amount of motion includes a second level of motion that is higher than the first level of motion, and/or determining a third frame rate when the amount of motion includes a third level of motion that is higher than the second level of motion. In some examples, the third frame rate can be higher than the first frame rate and the second frame rate, and the second frame rate can be higher than the first frame rate. Moreover, in some cases, encoding the set of frames can include encoding the set of frames at the first frame rate when the amount of motion includes the first level of motion, encoding the set of frames at the second frame rate when the amount of motion includes the second level of motion, and/or encoding the set of frames at the third frame rate when the amount of motion includes the third level of motion.

In some aspects, the apparatuses described above can include the one or more sensors. In some examples, the apparatuses described above can include a mobile phone, a wearable device, a mobile computer, a head-mounted display, and/or a camera.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

In order to describe the manner in which the above-recited and other advantages and features of the disclosure can be obtained, a more particular description of the principles described above will be rendered by reference to specific embodiments thereof which are illustrated in the appended drawings. Understanding that these drawings depict only example embodiments of the disclosure and are not to be considered to limit its scope, the principles herein are described and explained with additional specificity and detail through the use of the drawings in which.

DETAILED DESCRIPTION

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Disclosed herein are systems, methods, and computer-readable media for performing automated slow motion video recording using adaptive frame rates. Slow-motion video is a video effect in which time appears to slow down at certain parts of the video. Slow-motion video playback can be achieved when the video is captured and/or encoded at a higher frame rate and played back at a lower frame rate (and thus stretched out over a longer period of time). Slow-motion video playback is often used by viewers to more clearly see fast movements or features that might otherwise be difficult or impossible for the human eye to perceive in their original state.

Typically, slow-motion video recording systems record the entire video at a high frame rate. However, this can impose significant burdens on resources used to generate, store, and/or stream such slow-motion videos, such as storage, power, bandwidth, and compute resources. Moreover, watching an entire video in slow motion can be tedious to a viewer who may not be interested in watching certain portions of the video in slow motion, such as portions that have little (or no) motion and portions that are of less interest to the viewer. While users can edit the video after it is recorded to modify which portions maintain a high frame rate and remain in slow motion, such post editing can also be tedious and undesirable to users. The approaches herein provide technical improvements to slow-motion video technologies and address the foregoing and other challenges, as further discussed herein.

Figure 6:
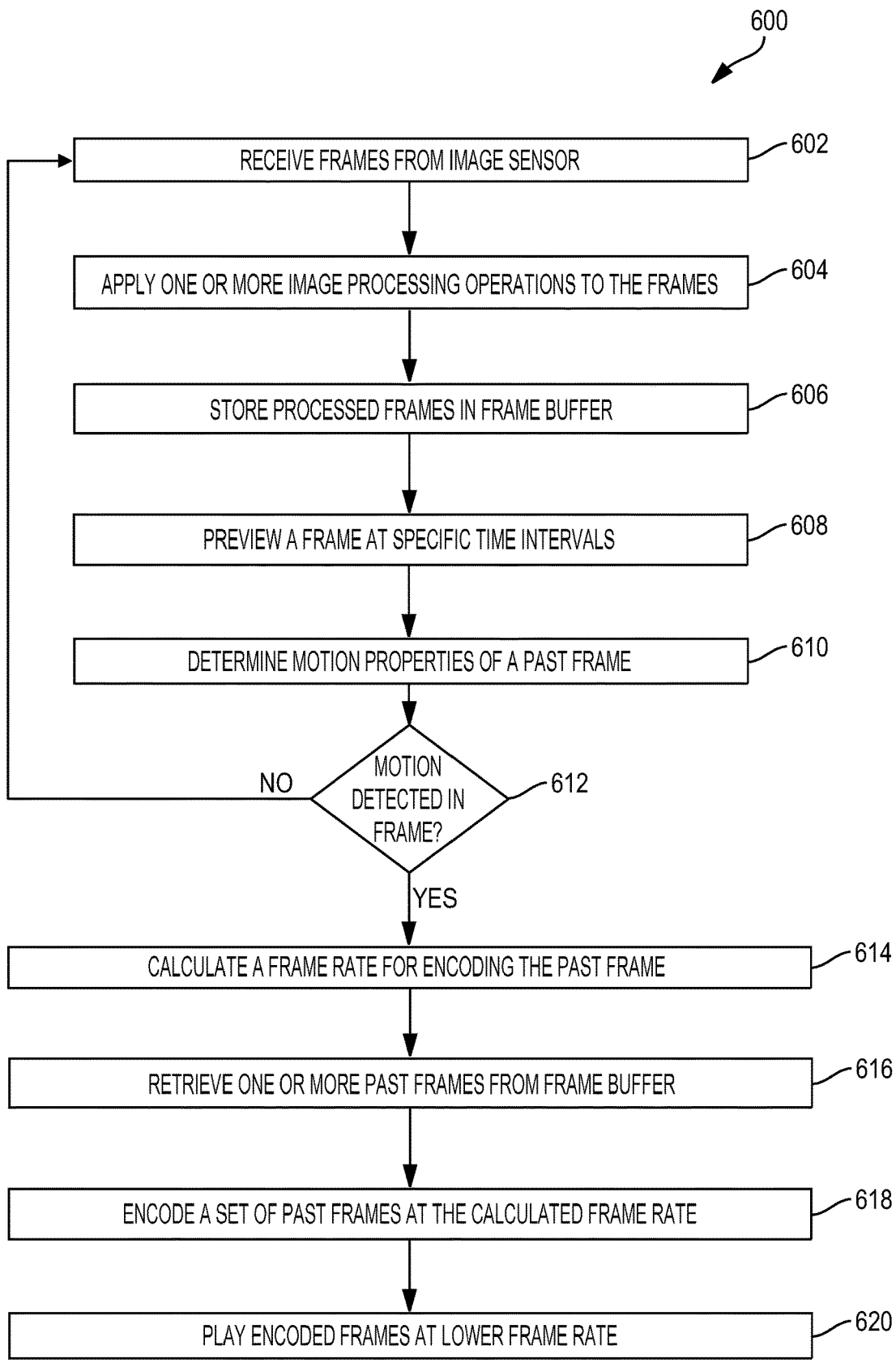
FIG. 6 illustrates an example flowchart for performing automated slow motion video recording, in accordance with some examples.
Figure 7:
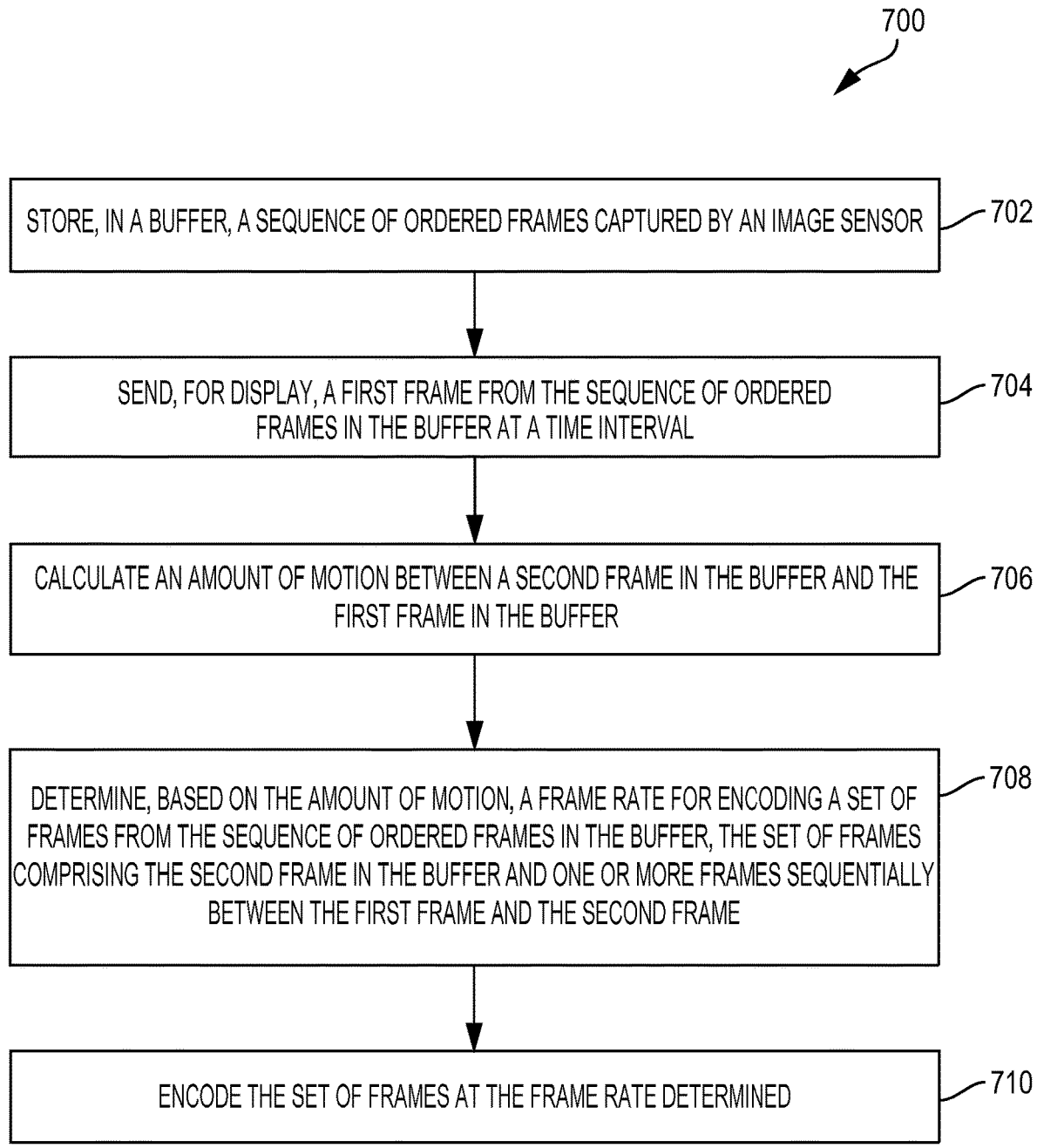
FIG. 7 illustrates an example method for automated slow motion video recording using adaptive frame rates, in accordance with some examples.
Figure 8:
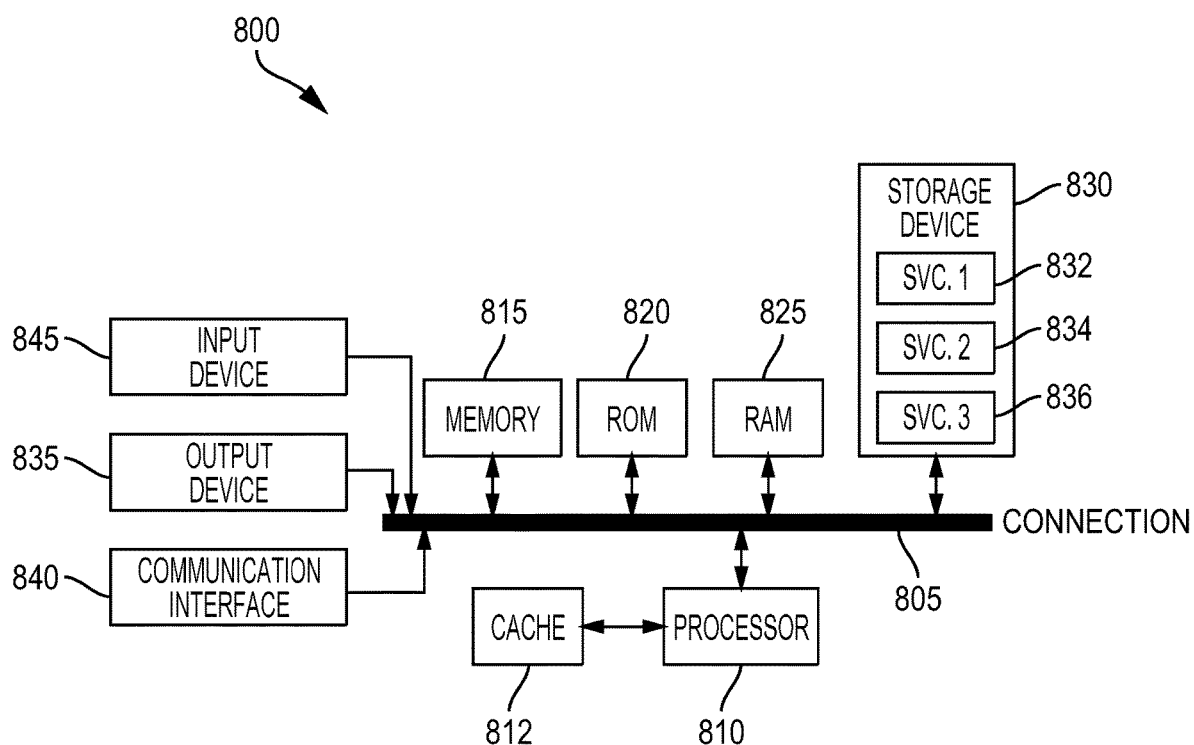
FIG. 8 illustrates an example computing device architecture, in accordance with some examples.

The present technology will be described in the following disclosure as follows. The discussion begins with a description of example systems, architectures, and techniques for performing automated slow motion video recording using adaptive frame rates, as illustrated in FIGS. 1 through 5. A description of example flows and methods for performing automated slow motion video recording using adaptive frame rates, as illustrated in FIGS. 6 and 7, will then follow. The discussion concludes with a description of an example computing device architecture including example hardware components suitable for performing automated slow motion video recording, as illustrated in FIG. 8. The disclosure now turns to FIG. 1.

Figure 1:
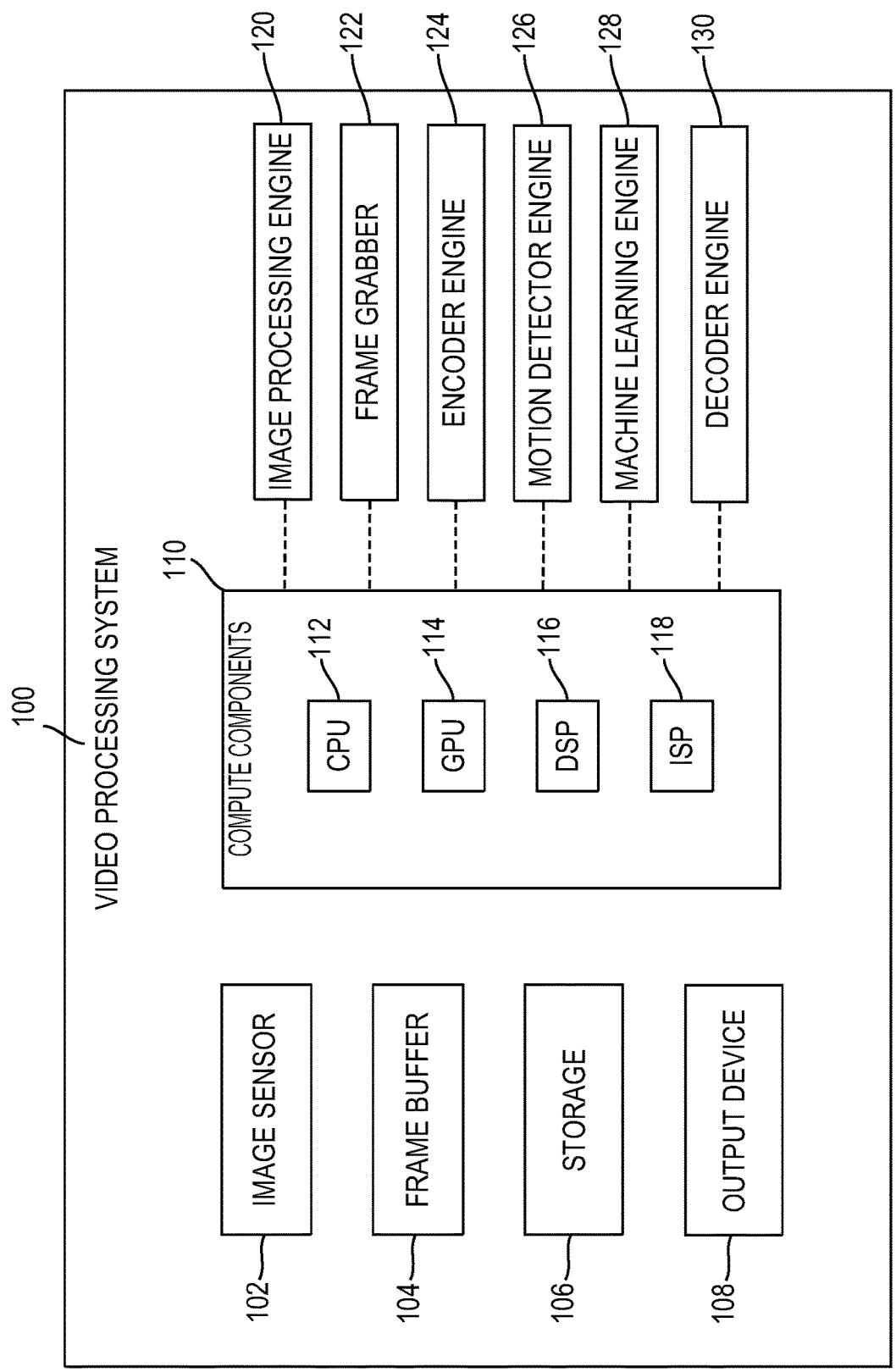
FIG. 1 illustrates an example architecture of a video processing system, in accordance with some examples.

FIG. 1 illustrates an example architecture of a video processing system 100. The video processing system 100 can perform various image/video processing tasks and generate various image/video processing effects as described herein. For example, the video processing system 100 can perform automated slow motion video recording and can adaptively change the video recording frame rates on demand or in real time (or near real time). In some illustrative examples, the video processing system 100 can adaptively change the video frame rates based on the amount/intensity of motion and/or activity in the recorded scene(s). While a slow motion effect is used herein as an illustrative example effect that can be produced by the video processing system 100, the video processing system 100 and techniques herein can also be used for other image/video processing effects, such as feature extraction effects, image recognition effects, machine vision effects, any combination thereof, and/or for any other image/video processing effects.

The video processing system 100 can be part of a computing device or multiple computing devices. For example, the video processing system 100 can be part of one or more electronic devices such as a camera system (e.g., a digital camera, an IP camera, a video camera, a security camera, etc.), a telephone system (e.g., a smartphone, a cellular telephone, a conferencing system, etc.), a desktop computer, a laptop or notebook computer, a tablet computer, a television, a gaming console, a video streaming device, a robotic device, an IoT (Internet-of-Things) device, a smart wearable device, or any other suitable electronic device(s). In some examples, the video processing system 100 can be part of a camera system capable of capturing and recording videos.

In the example shown in FIG. 1, the video processing system 100 includes an image sensor 102, a frame buffer 104, a storage 106, an output device 108, compute components 110, an image processing engine 120, a frame grabber 122, a encoder engine 124, a motion detector engine 126, a machine learning engine 128, and a decoder engine 130. While the video processing system 100 is shown to include certain components, one of ordinary skill in the art will appreciate that the video processing system 100 can include more or fewer (and/or different) components than those shown in FIG. 1. For example, the video processing system 100 can include, in some instances, one or more memory devices (e.g., RAM, ROM, cache, and/or the like), one or more networking interfaces (e.g., wired and/or wireless communications interfaces and the like), one or more camera lenses, and/or any other hardware or processing devices that are not shown in FIG. 1. An illustrative example of a computing device and hardware components that can be implemented with the video processing system 100 is described below with respect to FIG. 9.

In some implementations, the image sensor 102, the frame buffer 104, the storage 106, the output device 108, the compute components 110, the image processing engine 120, the frame grabber 122, the encoder engine 124, the motion detector engine 126, the machine learning engine 128, and the decoder engine 130 can be part of the same computing device. For example, in some cases, the image sensor 102, the frame buffer 104, the storage 106, the output device 108, the compute components 110, the image processing engine 120, the frame grabber 122, the encoder engine 124, the motion detector engine 126, the machine learning engine 128, and the decoder engine 130 can be integrated into a camera, smartphone, laptop, tablet computer, smart wearable device, gaming system, and/or any other computing device. However, in some implementations, the image sensor 102, the frame buffer 104, the storage 106, the output device 108, the compute components 110, the image processing engine 120, the frame grabber 122, the encoder engine 124, the motion detector engine 126, the machine learning engine 128, and the decoder engine 130 can be part of two or more separate computing devices.

The image sensor 102 can be any image sensor or capturing device, such as a digital or video camera sensor, a smartphone camera sensor, a video capture/recording device on an electronic apparatus such as a television, computer, camera, etc. In some cases, the image sensor 102 can be part of a camera or computing device such as a digital or video camera, an IP camera, a smartphone, a smart television, a gaming system, etc. The image sensor 102 can capture image and video content (e.g., raw image or video data), which can then be processed by the compute components 110, the image processing engine 120, the frame grabber 122, the encoder engine 124, the motion detector engine 126, the machine learning engine 128, and/or the decoder engine 130 as described herein. In some implementations, the image sensor 102 can include a high frame rate image sensor capable of capturing high frame rate frames.

The frame buffer 104 can provide buffer space usable by any of the compute components 110. The frame buffer 104 can store frames captured by the image sensor 102 and retain such frames for subsequent processing by the compute components 110 (e.g., via the image processing engine 120, the frame grabber 122, the encoder engine 124, the motion detector engine 126, the machine learning engine 128, and/or the decoder engine 130). As further described herein, in some cases, the frame buffer 104 can store frames captured by the image sensor 102 after such frames are processed or pre-processed by the image processing engine 120.

In some implementations, the frame buffer 104 can be a ring buffer. The ring buffer can be used to store frames and provide a circular or first-in first-out (FIFO) queue for such frames. Moreover, the frame buffer 104 can be implemented by, or part of, a circuit board on the video processing system 100, the storage 106, one or more of the compute components 110, or a separate memory device.

The storage 106 can be any storage device(s) for storing data, such as image or video data for example. Moreover, the storage 106 can store data from any of the components of the video processing system 100. For example, the storage 106 can store data from the image sensor 102, data from the compute components 110 (e.g., processing parameters, output images and/or videos, calculation results, etc.), and/or data (e.g., output images, processing results, etc.) from the image processing engine 120, the frame grabber 122, the encoder engine 124, the motion detector engine 126, the machine learning engine 128, and/or the decoder engine 130. In some examples, the storage 106 can include a buffer for storing data (e.g., image data) for processing by the compute components 110.

The output device 108 can be any device capable of rendering/displaying data such as images and videos. In some examples, the output device 108 can be a display device for presenting images and videos.

In some implementations, the compute components 110 can include a central processing unit (CPU) 112, a graphics processing unit (GPU) 114, a digital signal processor (DSP) 116, and/or an image signal processor (ISP) 118. The compute components 110 can perform various operations such as slow motion video processing and recording, image enhancement, object or image segmentation, computer vision, graphics rendering, augmented reality, image/video processing, sensor processing, recognition (e.g., motion recognition, activity recognition, object recognition, feature recognition, tracking or pattern recognition, scene change recognition, etc.), disparity detection, machine learning, filtering, and any of the various operations described herein. In some examples, the compute components 110 can implement the image processing engine 120, the frame grabber 122, the encoder engine 124, the motion detector engine 126, the machine learning engine 128, and the decoder engine 130. In other examples, the compute components 110 can also implement one or more other processing engines.

In some cases, the operations for the image processing engine 120, the frame grabber 122, the encoder engine 124, the motion detector engine 126, the machine learning engine 128, and the decoder engine 130 can be implemented by one or more of the compute components 110. For example, the image processing engine 120, the frame grabber 122, the encoder engine 124, the motion detector engine 126, the machine learning engine 128 (and associated operations), and the decoder engine 130 can be implemented by the CPU 112, the GPU 114, the DSP 116, and/or the ISP 118. In some cases, the compute components 110 can include other electronic circuits or hardware, computer software, firmware, or any combination thereof, to perform any of the various operations described herein.

In some cases, the compute components 110 can receive data (e.g., image/video data, etc.) captured by the image sensor 102 and process the data to generate output frames, some of which can have a slow motion effect. For example, the compute components 110 can receive image/video data (e.g., one or more frames, etc.) captured by the image sensor 102, detect any motion and/or activity in the captured scene (e.g., in captured frames) based on the image/video data, and generate a video having a slow motion effect, with some of the frames in the video having a higher frame rate adaptively produced based on the detected motion and/or activity in the captured scene. In some examples, a frame can include a red-green-blue (RGB) image or frame having red, green, and blue color components per pixel; a luma, chroma-red, chroma-blue (YCbCr) image or frame having a luma component and two chroma (color) components (chroma-red and chroma-blue) per pixel; or any other suitable type of color or monochrome picture.

The compute components 110 can implement the image processing engine 120, the frame grabber 122, the encoder engine 124, the motion detector engine 126, the machine learning engine 128, and the decoder engine 130 to perform various image processing operations and generate/record a video having a slow motion effect as described herein. For example, the compute components 110 can implement the image processing engine 120, the frame grabber 122, the encoder engine 124, the motion detector engine 126, and/or the machine learning engine 128 to perform automated slow motion video recording as described herein. The compute components 110 can process image data or frames captured by the image sensor 102 to perform such slow motion video recording.

The image processing engine 120 can perform various image processing operations. For example, the image processing engine 120 can perform lens shading correction, downsampling, feature detection, blurring, segmentation, filtering, color correction, noise reduction, scaling, demosaicing, pixel interpolation, image signal processing, image enhancement, color space conversion, etc. Moreover, the image processing engine 120 (and associated operations) can be implemented by one or more of the compute components 110. For example, the image processing engine 120 can be implemented by the CPU 112, the DSP 116, and/or the ISP 118, and the GPU 114 can implement operations for rendering image/video data from the image processing engine 220 (and/or the encoder engine 124).

The frame grabber 122 can obtain frames captured by the image sensor 102 and stored in the frame buffer 104, and provide such frames to the encoder engine 124, motion detector engine 126, and/or machine learning engine 128 for further processing.

The encoder engine 124 can encode video data to generate an encoded video bitstream. In some examples, an encoded video bitstream (or "video bitstream" or "bitstream") is a series of one or more coded video sequences. A coded video sequence (CVS) can include a series of access units (AUs) starting with an AU. An access unit (AU) can include one or more coded pictures and control information corresponding to the coded pictures that share the same output time. Coded slices of pictures can be encapsulated in the bitstream level into data units called network abstraction layer (NAL) units.

In some examples, the encoder engine 124 can encode video frames at specific frame rates, which can be used to generate certain effects such as slow motion effects. For example, the encoder engine 124 can encode high frame rate frames which, when played at a lower frame rate can create a slow motion effect. In some cases, the encoder engine 124 can adaptively encode frame rates based on an amount/intensity of motion or activity detected in a captured scene (and/or in the associated frames to be encoded). For example, if a set of frames capture a high amount of motion or activity, the encoder engine 124 can encode the set of frames at a higher frame rate, and if a different set of frames capture a low amount of motion or activity, the encoder engine 124 can adaptively change the encoding for such frames to a lower frame rate. Moreover, in some cases, the encoder engine 124 can adaptively change the frame rates for different frames on demand or in real time (or near real time).

The motion detector engine 126 can analyze image/video data (e.g., frames) to determine a magnitude of motion (if any) in the image/video data. For example, the motion detector engine 126 can perform one or more optical flow techniques to estimate a motion in or between image frames. In some examples, the motion detector engine 126 can estimate a motion in a sequence of ordered images or frames as either image velocities or discrete image displacements.

The machine learning engine 128 can implement one or more neural networks to process frames and detect actions in the frames. In some examples, the machine learning engine 128 can implement a convolutional neural network (CNN), a time-delay neural network (TDNN), or a probabilistic neural network (PNN).

A neural network implemented by the machine learning engine 128 can be trained to recognize one or more actions in frames. These actions may be previously defined or previously identified actions. The neural network implemented by the machine learning engine 128 can be previously trained using one or more videos (e.g., video footage clips) as input, where each input video includes one or more frames. Labels can be added to the input video (e.g., added by a person or automatically added), which classify whether each input video, or whether one or more frames of each input video, includes one or more of the previously defined actions. Using the one or more input videos and labels, the parameters (e.g., weights, biases, and/or other parameters) of the neural network can be tuned using backpropagation techniques, thus training the neural network to detect similar actions when input video is processed by the neural network during inference (or run-time).

For example, during training, the neural network can receive a video as input, and can provide an output indicating a likelihood (e.g., a probability) of the video including a defined action. The labels can be compared with the actual output from the neural network to determine a loss or error associated with the actual outputs. The loss can be based on any suitable loss function, such as a using mean squared error (MSE) function, a mean absolute error (MAE) function, a Huber loss function, a log cosh loss function, a quantile loss function, a log loss function, an exponential loss function, a focal loss function, a cross-entropy loss function, a hinge loss functions, a Kullback-Liebler (KL) divergence loss function, any suitable combination thereof, and/or other loss function.

Using the determined loss, backpropagation can be used to determine whether parameters (e.g., weights, biases, etc.) of the neural network should be adjusted in order to improve the accuracy by reducing the error to be within a certain threshold error or to be within a threshold similarity to the corresponding label. For example, the internal machine learning parameters (e.g., by modifying the weights and/or other parameters associated with various neurons or layers) can be adjusted, which can change the output generated by the neural network when another input video is received, and thus will reduce the overall loss.

Once the parameters (e.g., the weights and/or other parameters of the hidden layers) are adjusted based on the loss, another input video and a corresponding label can be input to the neural network. The neural network can then generate another output based on input video, and the loss associated with the new input video can be determined. The loss associated with the new input video can again be used to determine how much the parameters of the neural network should be adjusted to further increase its output accuracy. The loss determination and backpropagation processes can be repeated for several iterations (also referred to as epochs) to improve the accuracy of the neural network until a predicted output is generated that is below the threshold error or within the threshold similarity of the labels.

The defined actions the neural network implemented by the machine learning engine 128 can be trained to detect or identify can include, for example, a person or animal running, a person or animal jumping, a person or animal throwing an object (e.g., an athlete throwing a ball), a person or animal colliding with an object (e.g., an athlete catching a ball), a person or animal colliding with one or more other a persons or animals (e.g., one athlete tackling another athlete), an object held by a person or animal colliding with another object (e.g., a baseball bat held by a baseball player colliding with a baseball), a particular acrobatic maneuver by a person or animal (e.g., a front flip, a back flip, a barrel roll, a twirl, or a combination thereof), a person or animal diving into a liquid, a person or animal or object entering into a liquid, a collision of one or more objects (e.g., an automobile collision, a projectile hitting a wall or other object), another defined action, or some combination thereof.

The decoder engine 130 can decode video bitstream data encoded by the encoder engine 124. For example, the decoder engine 130 can receive as input video bitstream data encoded by the encoder engine 124, and perform decoding operations on the input video bitstream data to generate a decoded video. In some examples, the decoder engine 130 can decode video bitstream data by entropy decoding (e.g., using an entropy decoder) and extracting the elements of one or more coded video sequences making up the encoded video data. The decoder engine 130 may then rescale and perform an inverse transform on the encoded video bitstream data. Residual data is then passed to a prediction stage of the decoder engine 130. The decoder engine 130 then predicts a block of pixels (e.g., a PU). In some examples, the prediction is added to the output of the inverse transform (the residual data).

The decoder engine 130 may output the decoded video to a video destination device, which may store, transmit or display the decoded video data. For example, the decoder engine 130 may output the decoded video to the output device 108, which may display the decoded video data to a consumer of the content.

Figure 2:
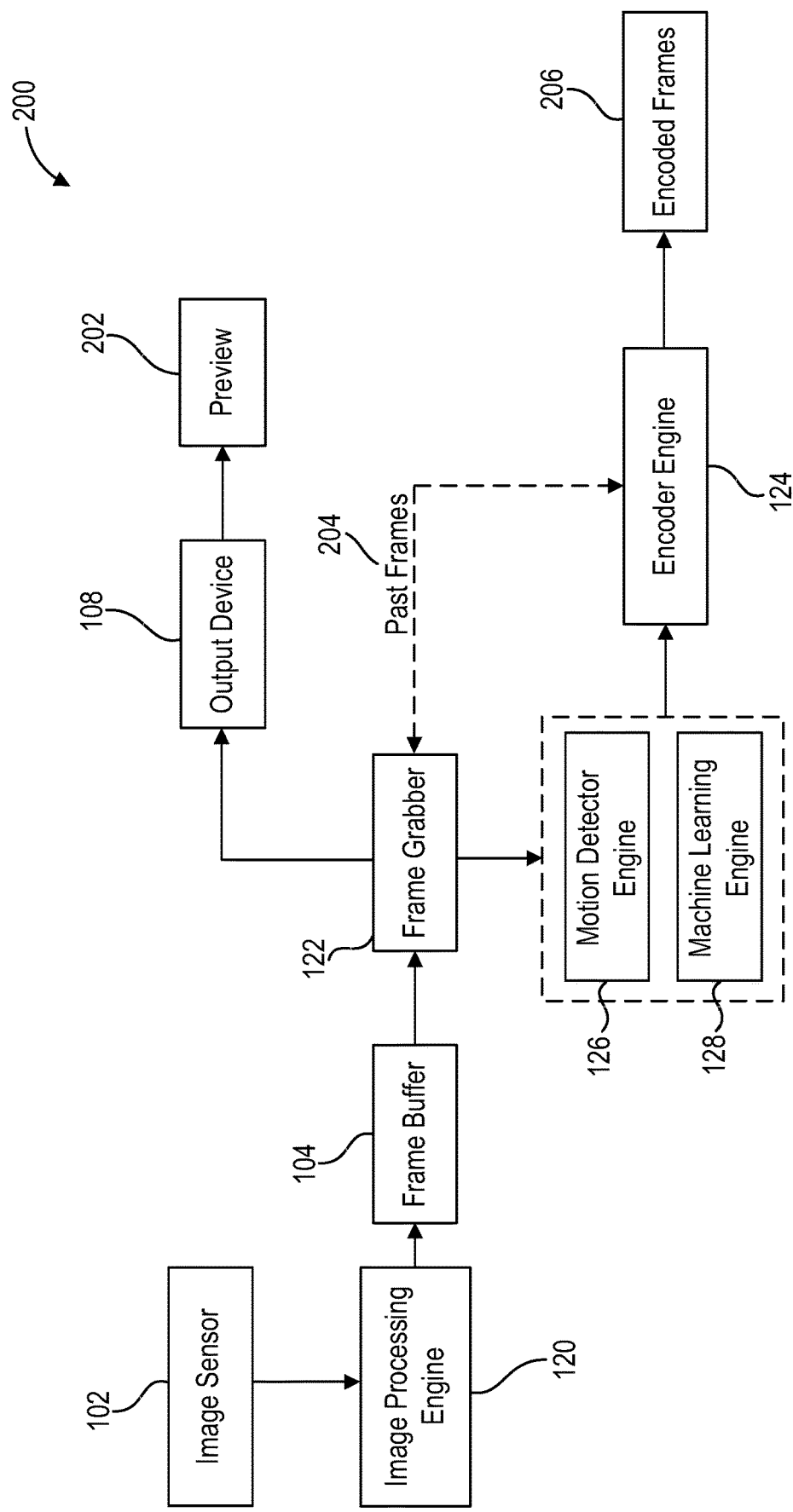
FIG. 2 illustrates a system flow for performing automated slow motion video recording with adaptive frame rates, in accordance with some examples.

FIG. 2 illustrates a system flow 200 for performing automated slow motion video recording with adaptive frame rates. The image sensor 102 can first capture video frames of a scene. In some cases, the image sensor 102 can be a high frame rate image sensor. Thus, the video frames captured by the image sensor 102 can be captured at high frame rates, such as 480 FPS (frames per second), 960 FPS, and/or other high frame rate.

The image processing engine 120 can receive the captured frames from the image sensor 102 and perform image processing operations such as, for example and without limitation, lens shading correction, downsampling, segmentation, filtering, color correction, noise reduction, scaling, demosaicing, pixel interpolation, image signal processing, image enhancement, color space conversion, etc.

The image processing engine 120 can then store the processed frames in the frame buffer 104. The frame buffer 104 can be a ring buffer configured to store a certain number of frames for further processing. In some examples, the frame buffer 104 can store the frames in a circular or FIFO queue for later processing.

The frame grabber 122 can obtain a frame stored in the frame buffer 104 and provide the frame to the output device 108. In some cases, the frame grabber 122 can obtain the newest frame in the frame buffer 104 and provide the newest frame to the output device 108. Moreover, in some implementations, the frame grabber 122 can send a frame from the frame buffer 104 to the output device 108 at specific intervals or rates. For example, the frame grabber 122 can send a different frame from the frame buffer 104 to the output device 108 every 33 milliseconds (e.g., at 30 FPS). When the output device 108 receives a frame from the frame grabber 122, the output device 108 can render/display a preview 202 based on the received frame.

The frame grabber 122 can also provide a frame from the frame buffer 104 to the motion detector engine 126 for motion estimation. In some cases, the frame grabber 122 can provide the motion detector engine 126 the same frame it provided to the output device 108 (e.g., with some delay between providing the frame to the output device 108 and providing the frame to the motion detector engine 126). In other cases, the frame grabber 122 can provide the motion detector engine 126 an older frame in the frame buffer 104 than the frame provided to the output device 108. This can provide some time or delay to allow the motion detector engine 126 to perform the motion estimation. In some cases, the time or delay can also allow the encoder engine 124 to encode the frame and/or obtain additional, past frames in the frame buffer 104 for adaptive higher frame rate encoding as described herein.

In some cases, the motion detector engine 126 can obtain from the frame grabber 122 one or more frames in the frame buffer 104 at specific intervals or rates. In some examples, the motion detector engine 126 can obtain from the frame grabber 122 one or more different frames in the frame buffer 104 at different intervals/rates, which can depend on the amount of motion and/or activity detected for such frames.

When the motion detector engine 126 receives a frame from the frame grabber 122, the motion detector engine 126 can perform motion estimation to determine a magnitude of motion in the frame and/or scene captured in the frame. In some cases, the motion detector engine 126 can compare the frame and the past frame to calculate image velocities or discrete image displacements used to estimate the motion between the frames.

In some examples, the motion detector engine 126 can perform optical flow or block matching techniques to estimate a motion between the received frame and a past (e.g., previous) frame, such as the frame provided by the frame grabber 122 to the output device 108. In other examples, the motion detector engine 126 can implement any other motion estimation techniques to estimate the motion between the received frame and a past frame. Other non-limiting examples of motion estimation approaches include phase correlation and frequency domain approaches, pixel recursive approaches, parametric motion estimation, and multi-resolution approaches.

In some cases, the frame grabber 122 can provide the frame from the frame buffer 104 to the machine learning engine 128 in lieu of, or in addition to, providing the frame to the motion detector engine 126. The machine learning engine 128 can then analyze the frame to determine whether the frame depicts one or more specific actions. The machine learning engine 128 can detect actions in a frame as previously described with respect to FIG. 1.

After performing motion estimation, the motion detector engine 126 can provide to the encoder engine 124 a motion vector indicating or describing an amount/magnitude of motion (if any) detected for the frame (e.g., captured by the frame). The motion detected by the motion detector engine 126 can include motion captured by the frame as well as motion captured by one or more past (e.g., previous) frames in the frame buffer 104. For example, the motion detected by the motion detector engine 126 can include motion between the frame and a previous frame, such as the frame sent by the frame grabber 122 to the output device 108 for rendering/presentation of the preview 202. Such motion can include motion captured in the frame and any intervening frames between the frame and the previous frame used to estimate the motion.

In some implementations where the machine learning engine 128 is used to estimate actions in the frame, the machine learning engine 128 can provide to the encoder engine 124 an indication of the action(s) depicted in the frame and detected by the machine learning engine 128. In some cases, the machine learning engine 128 can provide to the encoder engine 124 one or more estimated probabilities that the frame depicts one or more respective actions. In other cases, the machine learning engine 128 can provide to the encoder engine 124 an estimated action having the highest probability as determined by the machine learning engine 128.

The encoder engine 124 can use the motion vector from the motion detector engine 126 and/or the activity information from the machine learning engine 128 to adaptively encode one or more frames, including the frame provided by the frame grabber 122 to the motion detector engine 126, at a particular frame rate and generate encoded frames 206 having the particular frame rate. For example, if the motion vector from the motion detector engine 126 indicates a high amount of motion was detected, the encoder engine 124 can encode one or more past frames 204 (including the frame provided by the frame grabber 122 to the motion detector engine 126) at a higher frame rate than if the motion vector had indicated a lower amount of motion.

Thus, the frame rate applied by the encoder engine 124 when encoding one or more frames to generate the encoded frames 206 can depend on, and/or can be a function of, the amount/magnitude of motion detected by the motion detector engine 126 (and/or the activity detected by the machine learning engine 128) for such frames. This way, the encoder engine 124 can adaptively change the frame rate of frames in a video captured by the image sensor 102 based on the amount of motion and/or activity in those frames. Moreover, since the magnitude of the slow motion effect of the encoded frames 206 can depend on the frame rate of the encoded frames 206 and the frame rate used to play the encoded frames 206, the encoded or recorded video generated by the encoder engine 124 can be automatically configured to provide different slow motion effects at different parts of the video (e.g., parts having a higher frame rate as opposed to parts having a lower frame rate).

For example, if the encoded frames 206 have a frame rate of 960 FPS and are played at a 30 FPS frame rate, the slow motion effect will be greater than if the encoded frames 206 played at 30 FPS had a frame rate of 240 FPS. Similarly, if the encoded frames 206 have a frame rate of 30 FPS and are played at a 30 FPS frame rate, the encoded frames 206 will not produce a slow motion effect (or will produce a smaller slow motion effect than if encoded at a frame rate that is higher than 30 FPS). Thus, by adaptively changing the frame rate of frames in a video captured by the image sensor 102 based on the amount of motion and/or activity in those frames, the encoder engine 124 can adaptively and intelligently vary the slow motion effects of the vide based on the amount of motion and/or activity in different parts of the video. Therefore, rather than generating an entire video in slow motion and requiring the user to consume the entire video in slow motion or do post editing to reconfigure the video to only provide a slow motion effect at specific parts, the encoder engine 124 can intelligently encode the video to have different frame rates at different parts depending on the motion/activity in the different parts, and thereby provide different slow motion effects based on the motion/activity in the different parts of the video.

In some examples, the encoder engine 124 can adaptively encode different frames at a number of different frame rates depending on the amount of motion detected by the motion detector engine 126 for such frames. For example, frames having no motion or a small amount of motion (e.g., a first level of motion below a first threshold) can be encoded at a normal or base frame rate (e.g., 20-30 FPS), fames having a higher amount of motion (e.g., a second level of motion higher than the first level of motion, above the first threshold set for the normal or base frame rate, and/or below a second threshold) can be encoded at a higher frame rate (e.g., at, or within a range of, 480 FPS), and frames having an even higher amount of motion (e.g., a third level of motion above the second threshold) can be encoded at an even higher frame rate (e.g., at, or within a range of, 960 FPS). In some cases, the encoder engine 124 can encode frames at different, varying frame rates corresponding to additional levels of motion than those described in the previous example.

The encoded frames 206 can be generated based on past frames 204, as previously described. In some examples, the number of past frames 204 used to generate the encoded frames 206 can depend on the frame rate being implemented for the encoded frames 206. For example, when generating encoded frames at a lower frame rate, the encoder engine 124 may use fewer frames (which the encoder engine 124 can obtain from the frame buffer 104) than when the encoder engine 124 generates encoded frames at a higher frame rate.

Figure 3:
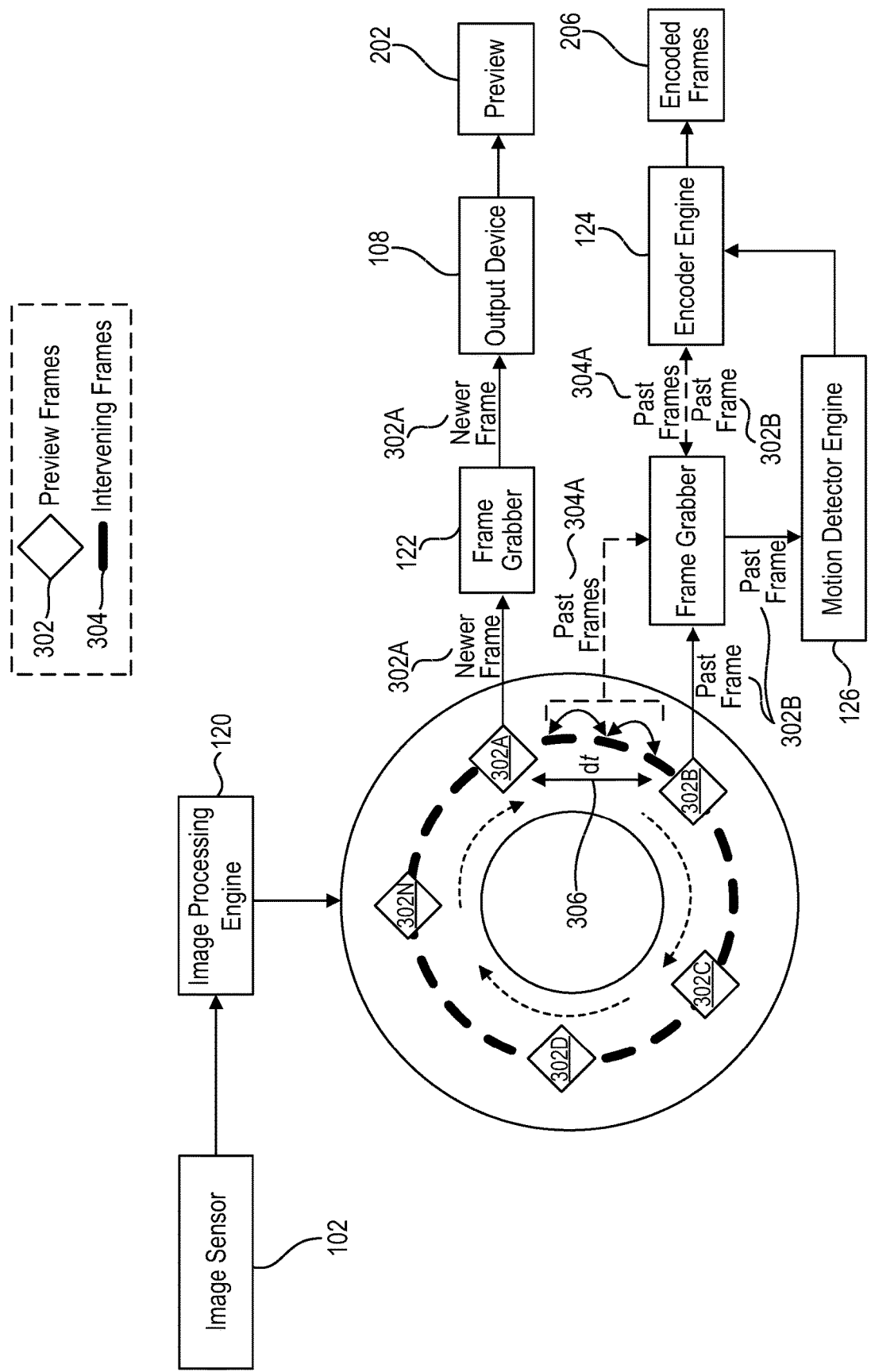
FIG. 3 is a diagram illustrating an example of a system for performing automated slow motion video recording with adaptive frame rates, in accordance with some examples.

FIG. 3 is a diagram illustrating an example system 300 for performing automated slow motion video recording with adaptive frame rates. In this example, the image sensor 102 can first capture video frames of a scene. The image sensor 102 can be a high frame rate image sensor configured to capture frames at high frame rates. The image processing engine 120 can receive the captured frames from the image sensor 102 and perform image processing operations such as, for example and without limitation, downsampling, segmentation, filtering, color correction, noise reduction, scaling, demosaicing, pixel interpolation, image signal processing, image enhancement, color space conversion, etc.

The image processing engine 120 can store the processed frames in the frame buffer 104. The frame buffer 104 in this example is a ring buffer configured to store a certain number of frames from the image processing engine 120 for further processing. As illustrated, the frame buffer 104 has stored a number of frames 302 and 304 for later processing. The frames 302 can include preview frames; meaning, frames that are sent to the output device 108 for rendering/presentation of a preview 202. Moreover, the frames 304 can include intervening frames; meaning, frames sequentially between preview frames.

For example, in some cases, the frame grabber 122 can send a new frame (e.g., a preview frame 302) from the frame buffer 104 to the output device 108 at specific intervals/rates (e.g., every n milliseconds and/or at n FPS), which the output device 108 can use to render/display a preview 202. Such frames sent to the output device 108 for previews are referred to herein as preview frames 302. On the other hand, any frames stored on the frame buffer 104 between two preview frames 302 are referred to herein as intervening frames 304, and can be used by the encoder engine 124 along with a preview frame 302 to generate the encoded frames 206 as described herein.

In FIG. 3, frame grabber 122 obtains preview frame 302A from the frame buffer 104 and sends it to the output device 108. The output device 108 can receive the preview frame 302A and render/display a preview 202 based on the preview frame 302A. The preview frame 302 can be a newer frame stored by the image processing engine 120 on the frame buffer 104.

Frame grabber 122 can also obtain preview frame 302B from the frame buffer 104 and send it to the motion detection engine 126 for motion estimation. In some cases, preview frame 302B can be a past preview frame that is older than preview frame 302A and was previously sent by frame grabber 122 to the output device 108 for previewing. Since the preview frame 302B is older in time than the preview frame 302A, there is a delay 306 in time between the time when the preview frame 302B was captured by the image sensor 102 and stored on the frame buffer 104 and the time when the preview frame 302A was captured by the image sensor 102 and stored on the frame buffer 104. This delay 306 in time can provide the motion detector engine 126 some time to perform motion estimation before the preview frame 302B (and intervening frames 304 between the preview frames 302A and 302B) becomes less relevant or obsolete to the user as new frames are captured by the image sensor 102 for the frame sequence of the video.

In some examples, the delay 306 can be based on the interval/rate at which new preview frames 302 are provided to the output device 108 for previewing. Moreover, in some cases, the delay 306 can be at least partly based on, or take into account, the amount of time it takes the motion detector engine 126 to perform motion estimation. For example, if the motion detector engine 126 takes 1 second (e.g., on average, at most, etc.) to perform motion estimation, the delay 306 can be greater than or equal to 1 second to give the motion detector engine 126 sufficient time to perform motion estimation before the newer preview frame 302A replaces, or catches up to, the older preview frame 302B in time and/or another preview frame replaces the preview frame 302A as the newer preview frame.

Within the delay 306, there can be one or more intervening frames 304 on the frame buffer 104. Such one or more intervening frames 304 can be used along with the preview frame 304B to generate encoded frames 206 at a particular frame rate, as further described herein. For example, if the encoder engine 124 needs additional frames (e.g., in addition to the preview frame 302B) to encode frames at a particular frame rate, the encoder engine 124 can use one or more of the intervening frames 304 between the preview frame 302A and the preview frame 302B to generate encoded frames at that particular frame rate.

When motion detector engine 126 obtains the preview frame 302B from the frame grabber 122, it can use the preview frame 302B and the preview frame 302A to estimate a motion between the preview frames 302A and 302B. The motion detector engine 126 can then generate a motion vector describing the motion between the preview frames 302A and 302B. The motion detector engine 126 can then provide the motion vector to the encoder engine 124 to inform the encoder engine 124 about the estimated motion between the preview frames 302A and 302B.

The encoder engine 124 can use the motion vector to determine a frame rate for generating the encoded frames 206. The encoder engine 124 can generate the encoded frames 206 by encoding the preview frame 302B and one or more intervening frames 304A between the preview frame 302A and the preview frame 302B at the determined frame rate. Moreover, the encoder engine 124 can select a higher frame rate for the encoded frames 206 when the motion between the preview frames 302A and 302B is higher (as determined based on the motion vector), and a lower frame rate when the motion between the preview frames 302A and 302B is lower. For example, if the motion vector indicates little to no motion, the encoder engine 124 can select a lower frame rate, such as 30 FPS for example, and if the motion vector indicates a high amount of motion, the encoder engine 124 can select a higher frame rate, such as 240 FPS or 480 FPS for example.

Thus, the encoder engine 124 can adaptively or intelligently select a low or lower frame rate when the motion intensity is low, and a higher frame rate when the motion intensity is higher. By selecting or changing the frame rate of frames based on the motion intensity estimated for such frames, the encoder engine 124 can adaptively or intelligently adjust or influence the slow motion effect produced by a portion of the video corresponding to the encoded frames. The encoder engine 124 can change the frame rate used to encode different frames to reflect or account for differences in the motion intensity in those frames, and thereby produce (in a dynamic or automated fashion) different slow motion effects for different portions of the video.

When generating the encoded frames 206 based on the motion vector from the motion detector engine 126, the encoder engine 124 can retrieve (e.g., via the frame grabber 122) one or more intervening frames 304A from the frame buffer 104. The encoder engine 124 can then generate the encoded frames 206 based on the preview frame 302B and the one or more intervening frames 304A. In some cases, the number of intervening frames used to generate the encoded frames 206 can at least partly depend on the frame rate used to encode the encoded frames 206. For example, when the frame rate is higher, the encoder engine 124 can use more intervening frames to generate the encoded frames 206 than when the frame rate is lower.

Figure 4:
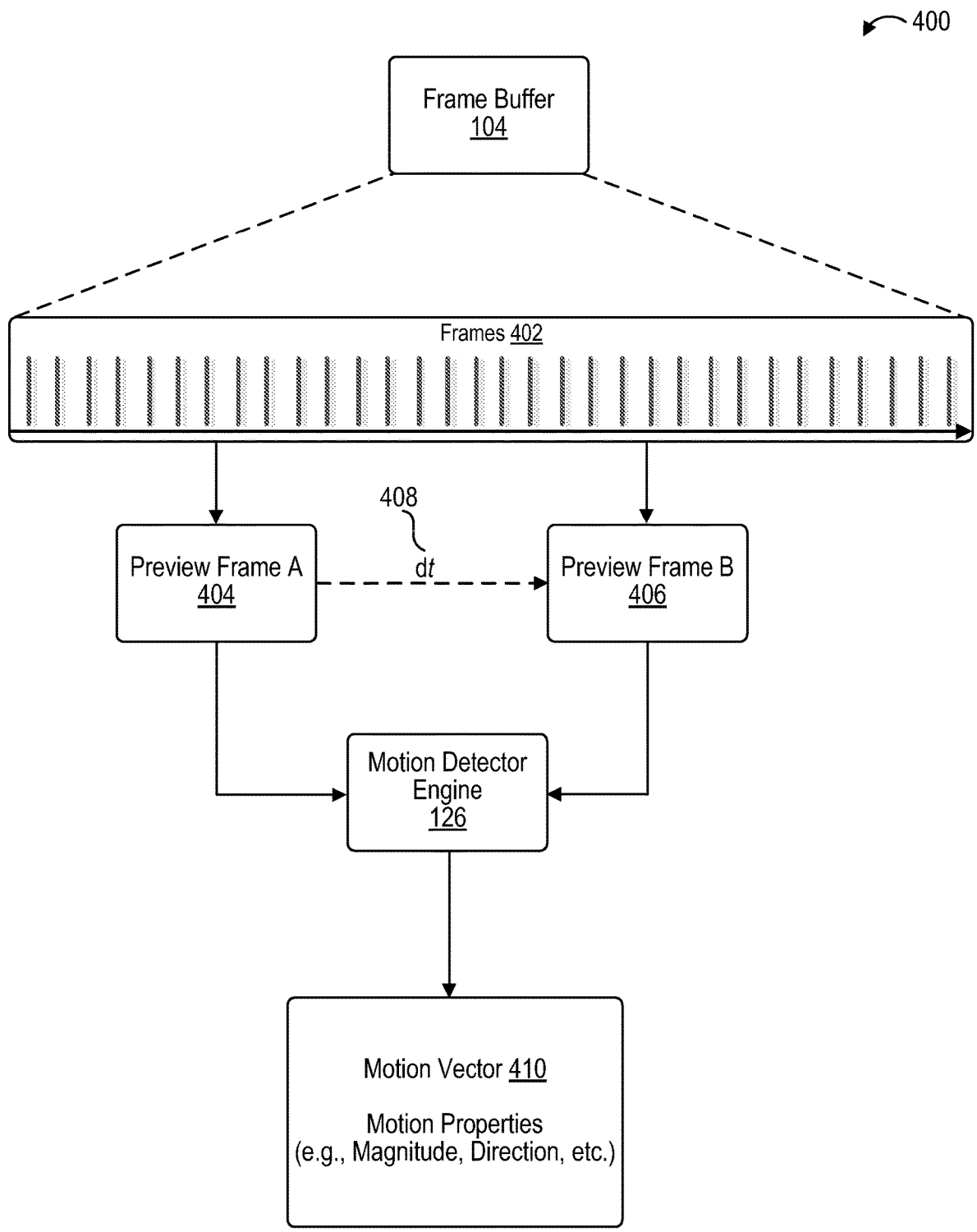
FIG. 4 is a diagram illustrating an analysis of frames in a frame buffer to estimate a motion in one or more frames, in accordance with some examples.

FIG. 4 illustrates an analysis 400 of frames in a frame buffer 104 to estimate a motion in one or more frames. In this example, the frame buffer 104 stores frames 402 captured by the image sensor 102 and processed by the image processing engine 120. The frames 402 can include a sequence of ordered frames associated with a video being captured by the image sensor 102. The frames 402 can be stored in the frame buffer 104 according to their sequential order.

To estimate the amount of motion reflected in the preview frame 406 (and/or between the preview frame 406 and the preview frame 404), the motion detector engine 126 can compare the preview frame 406 with the preview frame 404. In some examples, as reflected by the time difference 408 between the preview frame 404 and the preview frame 406, the preview frame 404 can be a newer frame used to generate a most recent preview (e.g., preview 202), and the preview frame 406 can be an older or past frame previously used to generate a preview. For example, as previously mentioned, the output device 108 can receive and render/present preview frames from the frame buffer 104 at specific time intervals or rates. Thus, in this example, the preview frame 406 can be a frame selected for previewing at a first time interval, and the preview frame 404 can be a frame selected for previewing at a second time interval after the first time interval.

The frames 402 in the frame buffer 104 can include other frames between the preview frames 404 and 406 (e.g., intervening frames) and other frames after the preview frame 406. However, the preview frames 404 and 406 can coincide with a specific interval for generating previews, and can thus be designated preview frames (and used to generate previews as previously described).

The time delay 408 between the preview frames 404 and 406 can afford the motion detector engine 126 time to estimate a motion between the preview frames 404 and 406. In some cases, the time delay 408 can be set to be greater than, or equal to, the amount of time it takes the motion detector engine 126 to perform motion estimation for the preview frames 404 and 406. Moreover, the time delay 408 can span one or more intervening frames between the preview frame 404 and the preview frame 406. In some examples, this can also provide the encoder engine 124 a pool of frames in the frame buffer 104, which the encoder engine 124 can draw from to generate encoded frames at a particular frame rate.

To calculate a motion between the preview frames 404 and 406, the motion detector engine 126 can employ one or more motion estimation approaches such as, for example and without limitation, optical flow approaches, block matching approaches, phase correlation and frequency domain approaches, pixel recursive approaches, parametric motion estimation approaches, multi-resolution approaches, etc. In some examples, the motion detector engine 126 can compare the preview frames 404 and 406 to determine image velocities or discrete image displacements, which can reflect a motion between the preview frames 404 and 406.

Based on the motion estimation, the motion detector engine 126 can generate a motion vector 410 describing the motion properties (e.g., magnitude/frequency/intensity of motion, direction, motion patterns, etc.) between the preview frames 404 and 406. The motion detector engine 126 can provide the motion vector 410 to the encoder engine 124, which can use the motion vector 410 to determine a frame rate for encoding the preview frame 406 and one or more intervening frames (e.g., one or more frames within the delay 408 between the preview frame 404 and the preview frame 406), as previously described.

Figure 5:
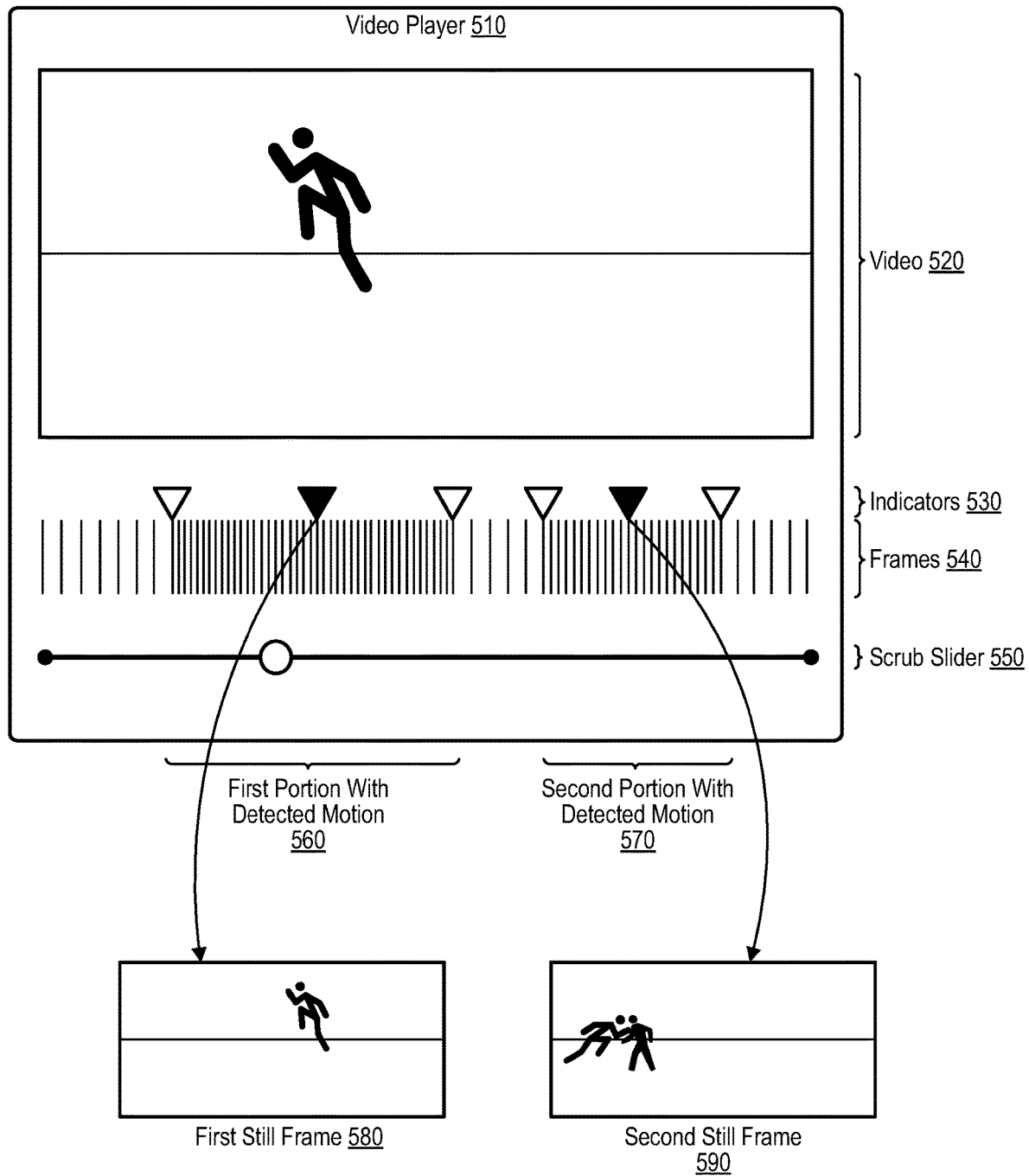
FIG. 5 illustrates an example video playback interface of a video player that shows indicators identifying portions of a video with detected motion and that are configured for slow-motion playback, in accordance with some examples.

FIG. 5 illustrates an example video playback interface of a video player 510, which shows indicators 530 identifying portions (e.g., frames) of a video 520 with detected motion and that are configured for slow-motion playback as described herein. The portions of the video 520 with detected motion can be configured for slow-motion playback based on a frame rate(s) used by the encoder engine 124 to encode the frames in the portions of the video 520. The frame rate(s) can be calculated based on the detected motion, as previously described. For example, the encoder engine 124 can determine the frame rate for one or more frames based on, for example, the existence of a detected motion in the one or more frames, a magnitude/intensity of motion in the one or more frames, and/or any other properties of the detected motion.

In FIG. 5, the interface of the video player 510 displays the video 520. The position of a displayed frame in the video 520 is denoted by a white circle along a scrub slider 550. The left side of the black line of the scrub slider 550 represents the beginning of the video 520 and the right side of the black line of the scrub slider 550 represents the end of the video 520. The video 520 may be captured and encoded as previously described with respect to FIGS. 2 and 3.

The video player 510 also illustrates frames 540 as a sequence of parallel vertical black lines. Each frame of the frames 540 is illustrated as a single vertical black line. The video player 510 also illustrates indicators 530 represented as black and white triangles with lower vertices pointing to a particular frame. The white triangles represent boundaries (e.g., beginnings and/or endings) of one or more consecutive portions (e.g., sequence of frames) of the video 520 in which motion has been detected.

The video 520 in this example includes two portions with detected motion, including a first portion with a first detected motion 560 and a second portion with a second detected motion 570. The first and last frames of the first portion with the first detected motion 560 are marked by white-triangle indicators 530 which, in some examples, may be stored in metadata as timestamps and/or frame numbers corresponding to those frames. Likewise, the first and last frames of the second portion with the second detected motion 570 are marked by white-triangle indicators 530 which, in some examples, may be stored in metadata as timestamps and/or frame numbers corresponding to those frames.

The frames 540 as illustrated show that the portions of the video 520 without detected motions (e.g., those portions other than the first portion and the second portion respectively containing the detected motions 560 and 570) are encoded at a lower frame rate (relative to the first portion and the second portion of the video 520 containing the detected motions 560 and 570 and/or a high frame rate of capture in which the frames in those portions of the video 520 were captured by the image sensor 102), as denoted by the larger distance between the vertical lines representing frames (relative to the distances in the other portions encoded in a higher frame rate as discussed herein). Thus, when such portions of the video 520 are played back at a normal, low, or same playback frame rate, they will not produce a slow-motion effect.

The frames 540 as illustrated also show that the first portion and the second portion of the video 520, which contain the detected motions 560 and 570, are encoded at a higher frame rate (relative to the portions of the video 520 which do not contain the detected motions 560 and 570), as denoted by the smaller distance between the vertical lines representing frames (relative to the distances in the portions without detected motions). Thus, when such portions of the video 520 are played back at a normal or lower playback frame rate, they will produce a slow-motion effect. The frames 540 as illustrated also show that the second portion of the video 520 containing the second detected motion 570 are encoded at a higher frame rate than the portions that do not contain detected motions but at a lower frame rate than the first portion of the video 520 containing the first detected motion 560. Accordingly, when played back at a same or normal frame rate as the first portion of the video 520 containing the first detected motion 560, the second portion of the video 520 containing the second detected motion 570 will produce a smaller slow-motion effect than the first portion of the video 520 containing the first detected motion 560.

As previously noted, the frame rates used to encode the different portions of the video 520 can be based on the motion (or lack thereof), and/or characteristics of the motion, in those portions of the video 520, such that portions with a higher magnitude/intensity of motion are encoded at a higher frame rate than portions without motion or with a lower magnitude/intensity of motion. Accordingly, when the video 520 is then played back at a normal or lower frame rate, those portions of the video 520 with the higher frame rates (and the higher magnitude/intensity of motion) will produce a greater slow-motion effect than other portions of the video 520 encoded at the lower frame rates (and including the lower magnitude/intensity of motion or no motion).

The two indicators 530 illustrated as black triangles correspond to two still frames 580 and 80590, respectively, that are captured and encoded as described herein. In particular, the first portion of the video 520 with the first detected action 560 includes a first black-triangle indicator 530 from which an arrow extends downward to a first still frame 580 showing a person jumping, where jumping is the first detected action 560. The second portion of the video 520 with the second detected action 570 includes a second black-triangle indicator 530 from which an arrow extends downward to a second still frame 590 showing the person from the first still frame 580 colliding with another person, where the collision is the second detected action 570.

Having described example systems and concepts, the disclosure now turns to the example flowchart 600 and method 700 shown in FIGS. 6 and 7. The steps outlined in the flowchart 600 and method 700 are examples and can be implemented in any combination thereof, including combinations that exclude, add, or modify certain steps.

FIG. 6 illustrates an example flowchart 600 for performing automated slow motion video recording. At step 602, the video processing system 100 can receive frames from an image sensor 102. The frames can include a sequence of frames in a video captured by the image sensor 102.

At step 604, the video processing system 100 can apply (e.g., via the image processing engine 120) one or more image processing operations to the frames from the image sensor 102. The image processing operations can include, for example and without limitation, lens shading correction, downsampling, feature detection, blurring, segmentation, filtering, color correction, noise reduction, scaling, demosaicing, pixel interpolation, image signal processing, image enhancement, color space conversion, and/or any other image processing operation.

At step 606, the video processing system 100 can store the processed frames in a frame buffer 104. The video processing system 100 can store the processed frames in the frame buffer 104 temporarily for further processing. In some cases, the frame buffer 104 can provide or enable a circular or FIFO queue for subsequent processing of the stored frames.

At step 608, the video processing system 100 can preview a frame in the frame buffer 104 at specific time intervals. For example, the video processing system 100 can send a frame to an output device 108 for preview at a specific frame rate, such as every n milliseconds. To illustrate, the video processing system 100 can send a new frame in the frame buffer 104 to the output device 108 for preview. The image processing engine 120 can continue to process and store additional frames from the image sensor 102 in the frame buffer 104. After n milliseconds, the video processing system 100 can then send another new frame in the frame buffer 104 to the output device 108 for preview. Every n milliseconds, the video processing system 100 can continue to send newer frames in the frame buffer 104 to the output device 108 for preview.

At step 610, the video processing system 100 can determine (e.g., via the motion detector engine 126) motion properties of a past frame in the frame buffer 104. For example, the video processing system 100 can determine whether there is any motion (and if so, how much) between a frame previously sent to the output device 108 for preview and a newer frame being sent, or recently sent, to the output device 108 for preview. The motion properties can include a magnitude/intensity of motion, if any, detected for the frame. In some cases, the motion properties can also describe the magnitude/intensity of motion in any intervening frames between the past frame and a newer frame compared to the past frame to determine the motion properties.

At step 612, the video processing system 100 can determine (e.g., via the motion detector engine 126) if there is any motion detected in the past frame. In some cases, the video processing system 100 can determine if any motion is detected and, if so, whether the motion exceeds a configurable threshold amount of motion.

If the video processing system 100 does not detect any motion (or motion exceeding a threshold) in the past frame, the video processing system 100 can return to step 602, where it can continue to receive frames from the image sensor 102.

If the video processing system 100 does detect motion (or motion exceeding a threshold) in the past frame, at step 614 the video processing system 100 can calculate (e.g., via the encoder engine 124) a frame rate for encoding the past frame. The video processing system 100 can calculate the frame rate based on an amount of motion detected in the past frame. For example, the video processing system 100 can calculate a higher frame rate when the amount of motion detected is higher, and a lower frame rate when the amount of motion is lower.

The calculated frame rate can be used to encode the past frame and one or more past or intervening frames at a particular frame rate in order to produce a slow motion effect when such frames are played back at a normal or lower frame rate. Moreover, the video processing system 100 can calculate the frame rate dynamically while the past frame is stored in the frame buffer 104 and/or additional frames are being captured by the image sensor 102 and/or added to the frame buffer 104.

At step 616, the video processing system 100 can retrieve one or more past frames from the frame buffer 104 for encoding with the past frame. The one or more past frames can include one or more intervening frames between the past frame used to calculate the frame rate and a newer frame in the frame buffer 104. In some cases, the number of past frames retrieved by the video processing system 100 from the frame buffer 104 can depend on the frame rate calculated at step 614. For example, if the video processing system 100 calculates a high frame rate, the video processing system 100 may retrieve more past frames for encoding than if the video processing system 100 had calculated a lower frame rate. This can allow the video processing system 100 to achieve a higher or lower frame rate when encoding the past frame and the one or more past frames.

At step 618, the video processing system 100 can encode (e.g., via the encoder engine 124) a set of past frames at the calculated frame rate. The set of past frames can include the past frame from step 614 and the one or more past frames from step 616. The video processing system 100 can encode the set of past frames to achieve a slow motion effect when such frames are played back at a normal or lower frame rate. The video processing system 100 can adaptively encode the set of past frames based on the motion detected and the frame rate calculated, which can allow the video processing system 100 to encode different frame rates for different frames having different amounts of motion.

At step 620, the video processing system 100 can play (e.g., via the video player 510) the encoded frames at a lower frame rate than the frame rate used to encode such frames. This will produce a slow motion effect for the frames, which will vary based on the amount of motion in such frames, as previously explained.

FIG. 7 illustrates an example method 700 for automated slow motion video recording using adaptive frame rates. At step 702, the method 700 can include storing, in a buffer 104, a sequence of ordered frames captured by an image sensor 102. In some examples, a video processing system 100 can receive frames captured by the image sensor 102, process the frames via an image processing engine 120, and store the processed frames in the frame buffer 104 for subsequent processing (e.g., previewing, encoding, storing, playback, etc.).

At step 704, the method 700 can include sending, for display (e.g., to a display device 108), a first frame from the sequence of ordered frames in the buffer 104 at a time interval. In some examples, the video processing system 100 can send a different frame from the buffer 104 to a display device 108 for display at a particular frame rate, such as every n milliseconds. The video processing system 100 can send the different frame to the display device 108 for use by the display device 108 to present a preview. In some examples, each different frame sent to the display device 108 can be a newer frame than a previous frame sent to the display device 108. The display device 108 can receive each frame from the video processing system 100 and use the received frame to present or display a preview.

At step 706, the method 700 can include calculating an amount of motion between a second frame (e.g., 302B or 406) in the buffer 104 and the first frame (e.g., 302A or 404) in the buffer 104. In some cases, the amount of motion between the first frame in the buffer 104 and the second frame in the buffer 104 can be calculated based on a comparison of the first frame and the second frame. For example, the amount of motion can be calculated based on image velocities and/or image displacements between the first and second frames.

In some examples, the amount of motion can be calculated based on one or more optical flow or block matching techniques. In other examples, the amount of motion can be calculated based on any other motion estimation techniques such as, for example and without limitation, phase correlation and frequency domain approaches, pixel recursive approaches, parametric motion estimation, or multi-resolution approaches.

In some cases, the first frame can be a newer frame sent to the display device at a first time, and the second frame can be an older frame sent to the output device at a second time after the first time. In some cases, the first time and the second time can be determined based on the time interval, for example.

At step 708, the method 700 can include determining, based on the amount of motion, a frame rate for encoding a set of frames from the sequence of ordered frames in the buffer 104, the set of frames including the second frame (e.g., 302B or 406) in the buffer 104 and one or more frames (e.g., 304A) sequentially between the first frame and the second frame (e.g., one or more intervening frames). Moreover, the frame rate determined can be higher when the amount of motion calculated is higher than when the amount of motion calculated is lower. In other words, the frame rate can be adaptively determined based on the amount of motion, such that a higher amount of motion can result in a higher frame rate and vice versa.

At step 710, the method 700 can include encoding the set of frames at the frame rate determined. The method 700 here can generate a set of encoded frames (e.g., 206) having the frame rate calculated based on the amount of motion. Moreover, the frame rate used to encode the set of frames can be adaptive based on the motion detected as previously described.

In some examples, calculating the amount of motion, determining the frame rate, and encoding the set of frames can be performed while one or more new frames are being received from the image sensor 102 and/or stored in the frame buffer 104. Thus, the calculating, determining, and encoding steps can be performed on the demand or in real time (or near real time) as a video of frames is being captured by the image sensor 102 and recorded by the video processing system 100.

In some cases, the method 700 can include playing (e.g., via the video player 510) the set of frames encoded at a playback frame rate that is lower than the frame rate determined for the set of frames (and used to encode the set of frames). By playing the set of frames at the playback frame rate that is lower than the frame rate determined for the set of frames, the method 700 can produce a slow motion effect for the set of frames based on the frame rate determined and the playback frame rate.

In some cases, the method 700 can include storing a video including the sequence of frames. The video can include the set of frames encoded at the frame rate determined at step 708 and one or more additional sets of frames encoded at a lower frame rate than the frame rate associated with the set of frames. Thus, the stored video can include different sets of frames adaptively encoded at different frame rates to produce different slow-motion effects. Moreover, the lower frame rate used to encode the one or more additional sets of frames can be based on a respective motion captured in the one or more additional sets of frames.

In some cases, the method 700 can include storing, in the buffer 104, additional frames captured by the image sensor 102; sending, to the display device 108, a different one of the additional frames in the buffer 104 at the time interval; calculating an amount of motion between a newer frame from the additional frames and an older frame from the additional frames; determining, based on the amount of motion, a different frame rate for encoding an additional set of frames from the additional frames in the buffer 104; and encoding the additional set of frames at the different frame rate determined.

The additional set of frames can include the older frame from the additional frames and one or more frames sequentially between the newer frame and the older frame. Moreover, in some cases, the amount of motion calculated between the newer frame and the older frame can be higher than the amount of motion calculated between the first frame and the second frame at step 706. Here, the different frame rate determined for encoding the additional set of frames can be higher than the frame rate determined at step 708 for encoding the set of frames from the sequence of ordered frames.

In other cases, the amount of motion calculated between the newer frame and the older frame can be lower than the amount of motion calculated between the first frame and the second frame at step 706. Here, the different frame rate determined for encoding the additional set of frames can be lower than the frame rate determined at step 708 for encoding the set of frames from the sequence of ordered frames. As previously explained, such differences in frame rates can be adaptively calculated based on differences in the motion detected for the associated frames.

In some examples, determining, based on the amount of motion, the frame rate for encoding the set of frames can include determining a first frame rate for encoding the set of frames when the amount of motion calculated is greater than a motion threshold, and determining a second frame rate for encoding the set of frames when the amount of motion calculated is less than the motion threshold. In this example, the second frame rate can be lower than the first frame rate.

In some examples, determining the frame rate for encoding a set of frames from the sequence of ordered frames in the buffer can include determining a first frame rate when the amount of motion includes a first level of motion, determining a second frame rate when the amount of motion includes a second level of motion that is higher than the first level of motion, and/or determining a third frame rate when the amount of motion includes a third level of motion that is higher than the second level of motion. In some cases, the third frame rate can be higher than the first frame rate and the second frame rate, and the second frame rate can be higher than the first frame rate. Moreover, in some examples, encoding the set of frames can include encoding the set of frames at the first frame rate when the amount of motion includes the first level of motion, encoding the set of frames at the second frame rate when the amount of motion includes the second level of motion, and/or encoding the set of frames at the third frame rate when the amount of motion includes the third level of motion.

In some examples, the flowchart 600 and the method 700 may be performed by one or more computing devices or apparatuses. In one illustrative example, the flowchart 600 and the method 700 can be performed by the video processing system 100 shown in FIG. 1 and/or one or more computing devices with the computing device architecture 800800 shown in FIG. 8. In some cases, such a computing device or apparatus may include a processor, microprocessor, microcomputer, or other component of a device that is configured to carry out the steps of the flowchart 600 and the method 700. In some examples, such computing device or apparatus may include one or more sensors configured to collect sensor data. For example, the computing device can include a head-mounted display, a mobile device, a camera, or other suitable device. In some examples, such computing device or apparatus may include a camera configured to capture one or more images or videos. In some cases, such computing device may include a display for displaying images and/or videos. In some examples, the one or more sensors and/or camera are separate from the computing device, in which case the computing device receives the sensor data. Such computing device may further include a network interface configured to communicate data.

The flowchart 600 and the method 700 are illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the flowchart 600 and the method 700 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 8 illustrates an example computing device architecture 800 of an example computing device which can implement various techniques described herein. For example, the computing device architecture 800 can implement at least some portions of the computing system 100 shown in FIG. 1, and perform tracking, localization, mapping, and rendering operations as described herein. The components of the computing device architecture 800 are shown in electrical communication with each other using a connection 805, such as a bus. The example computing device architecture 800 includes a processing unit (CPU or processor) 810 and a computing device connection 805 that couples various computing device components including the computing device memory 815, such as read only memory (ROM) 820 and random access memory (RAM) 825, to the processor 810.

The computing device architecture 800 can include a cache of high-speed memory connected directly with, in close proximity to, or integrated as part of the processor 810. The computing device architecture 800 can copy data from the memory 815 and/or the storage device 830 to the cache 812 for quick access by the processor 810. In this way, the cache can provide a performance boost that avoids processor 810 delays while waiting for data. These and other modules can control or be configured to control the processor 810 to perform various actions. Other computing device memory 815 may be available for use as well. The memory 815 can include multiple different types of memory with different performance characteristics. The processor 810 can include any general purpose processor and a hardware or software service, such as service 1 832, service 2 834, and service 3 836 stored in storage device 830, configured to control the processor 810 as well as a special-purpose processor where software instructions are incorporated into the processor design. The processor 810 may be a self-contained system, containing multiple cores or processors, a bus, memory controller, cache, etc. A multi-core processor may be symmetric or asymmetric.

To enable user interaction with the computing device architecture 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art, such as a display, projector, television, speaker device, etc. In some instances, multimodal computing devices can enable a user to provide multiple types of input to communicate with the computing device architecture 800. The communications interface 840 can generally govern and manage the user input and computing device output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof. The storage device 830 can include services 832, 834, 836 for controlling the processor 810. Other hardware or software modules are contemplated. The storage device 830 can be connected to the computing device connection 805. In one aspect, a hardware module that performs a particular function can include the software component stored in a computer-readable medium in connection with the necessary hardware components, such as the processor 810, connection 805, output device 835, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

What is claimed is:

1. A method comprising:
   storing, in a buffer, a sequence of ordered frames captured by an image sensor, the sequence of ordered frames being captured at a first frame rate;
   sending, for display, a first frame from the sequence of ordered frames in the buffer, the first frame being sent at a time associated with a second frame rate;
   calculating an amount of motion between a second frame in the buffer and the first frame sent for display;
   determining, based on the amount of motion, a third frame rate for encoding a set of frames from the sequence of ordered frames in the buffer, the set of frames comprising the second frame in the buffer and a number of frames sequentially between the first frame and the second frame, the number of frames being selected at least partly based on the third frame rate for encoding the set of frames, the third frame rate including a higher frame rate when the amount of calculated motion is greater than a motion threshold and the third frame rate including a lower frame rate when the amount of calculated motion is less than the motion threshold, the lower frame rate being lower than the higher frame rate; and
   encoding the set of frames at the third frame rate.

2. The method of claim 1, further comprising displaying the set of frames at a playback frame rate that is lower than the third frame rate determined for the set of frames.

3. The method of claim 2, wherein displaying the set of frames at the playback frame rate that is lower than the third frame rate determined for the set of frames comprises producing a slow motion effect for the set of frames based on the third frame rate determined and the playback frame rate.

4. The method of claim 1, wherein the amount of motion between the first frame in the buffer and the second frame sent for display is calculated based on a comparison of the first frame and the second frame.

5. The method of claim 1, wherein the amount of motion between the first frame in the buffer and the second frame sent for display is calculated based on one of an optical flow technique or a block matching technique.

6. The method of claim 1, further comprising:
   storing a video comprising the sequence of frames, the video comprising the set of frames encoded at the third frame rate and at least one additional set of frames encoded at a lower frame rate than the third frame rate associated with the set of frames, the lower frame rate being based on a respective motion captured in the at least one additional set of frames.

7. The method of claim 1, wherein calculating the amount of motion, determining the third frame rate, and encoding the set of frames are performed while one or more new frames are at least one of being received from the image sensor and being stored in the frame buffer.

8. The method of claim 1, wherein the first frame rate and third frame rate are higher than the second frame rate.

9. The method of claim 1, further comprising presenting, using a display device, a preview comprising at least one of the first frame and the second frame, wherein at least one or more other frames in the sequence of ordered frames are not included in the preview, and wherein the at least one or more other frames are not presented in a different preview.

10. The method of claim 1, wherein determining the third frame rate for encoding a set of frames from the sequence of ordered frames in the buffer comprises at least one of determining a particular frame rate when the amount of motion comprises a first level of motion, determining a first different frame rate when the amount of motion comprises a second level of motion that is higher than the first level of motion, and determining a second different frame rate when the amount of motion comprises a third level of motion that is higher than the second level of motion.

11. The method of claim 10, wherein the second different frame rate is higher than the particular frame rate and the first different frame rate, and wherein the first different frame rate is higher than the particular frame rate.

12. The method of claim 11, wherein encoding the set of frames comprises at least one of encoding the set of frames at the particular frame rate when the amount of motion comprises the first level of motion, encoding the set of frames at the first different frame rate when the amount of motion comprises the second level of motion, and encoding the set of frames at the second different frame rate when the amount of motion comprises the third level of motion.

13. An apparatus comprising:
   a memory; and
   one or more processors configured to:
      store, in a buffer, a sequence of ordered frames captured by an image sensor, the sequence of ordered frames being captured at a first frame rate;
      send, for display, a first frame from the sequence of ordered frames in the buffer, the first frame being sent at a time associated with a second frame rate;
      calculate an amount of motion between a second frame in the buffer and the first frame sent for display;
      determine, based on the amount of motion, a third frame rate for encoding a set of frames from the sequence of ordered frames in the buffer, the set of frames comprising the second frame in the buffer and a number of frames sequentially between the first frame and the second frame, the number of frames being selected at least partly based on the third frame rate for encoding the set of frames, the third frame rate including a higher frame rate when the amount of calculated motion is greater than a motion threshold and the third frame rate including a lower frame rate when the amount of calculated motion is less than the motion threshold, the lower frame rate being lower than the higher frame rate; and
      encode the set of frames at the third frame rate.

14. The apparatus of claim 13, wherein the one or more processors are configured to display the set of frames at a playback frame rate that is lower than the third frame rate determined for the set of frames.

15. The method of claim 14, wherein displaying the set of frames at the playback frame rate that is lower than the third frame rate determined for the set of frames comprises producing a slow motion effect for the set of frames based on the third frame rate determined and the playback frame rate.

16. The apparatus of claim 13, wherein the amount of motion between the first frame in the buffer and the second frame sent for display is calculated based on a comparison of the first frame and the second frame.

17. The apparatus of claim 13, wherein the amount of motion between the first frame in the buffer and the second frame sent for display is calculated based on one of an optical flow technique or a block matching technique.

18. The apparatus of claim 13, wherein the one or more processors are configured to:
   store a video comprising the sequence of frames, the video comprising the set of frames encoded at the third frame rate and at least one additional set of frames encoded at a lower frame rate than the third frame rate associated with the set of frames, the lower frame rate being based on a respective motion captured in the at least one additional set of frames.

19. The apparatus of claim 13, wherein calculating the amount of motion, determining the third frame rate, and encoding the set of frames are performed while one or more new frames are at least one of being received from the image sensor and being stored in the frame buffer.

20. The apparatus of claim 13, wherein the first frame rate and third frame rate are higher than the second frame rate.

21. The method of claim 13, wherein the one or more processors are configured to present, using a display device, a preview comprising at least one of the first frame and the second frame, wherein at least one or more other frames in the sequence of ordered frames are not included in the preview, and wherein the at least one or more other frames are not presented in a different preview.

22. The apparatus of claim 13, wherein determining the third frame rate for encoding a set of frames from the sequence of ordered frames in the buffer comprises at least one of determining a particular frame rate when the amount of motion comprises a first level of motion, determining a first different frame rate when the amount of motion comprises a second level of motion that is higher than the first level of motion, and determining a second different frame rate when the amount of motion comprises a third level of motion that is higher than the second level of motion.

23. The apparatus of claim 22, wherein the second different frame rate is higher than the particular frame rate and the first different frame rate, and wherein the first different frame rate is higher than the particular frame rate.

24. The apparatus of claim 23, wherein encoding the set of frames comprises at least one of encoding the set of frames at the particular frame rate when the amount of motion comprises the first level of motion, encoding the set of frames at the first different frame rate when the amount of motion comprises the second level of motion, and encoding the set of frames at the second different frame rate when the amount of motion comprises the third level of motion.

25. The apparatus of claim 13, comprising at least one of a mobile phone and a camera system.

26. At least one non-transitory computer-readable medium comprising:
instructions stored thereon which, when executed by one or more processors, cause the one or more processors to:
store, in a buffer, a sequence of ordered frames captured by an image sensor, the sequence of ordered frames being captured at a first frame rate;
send, for display, a first frame from the sequence of ordered frames in the buffer, the first frame being sent at a time associated with a second frame rate;
calculate an amount of motion between a second frame in the buffer and the first frame sent for display;
determine, based on the amount of motion, a third frame rate for encoding a set of frames from the sequence of ordered frames in the buffer, the set of frames comprising the second frame in the buffer and a number of frames sequentially between the first frame and the second frame, the number of frames being selected at least partly based on the third frame rate for encoding the set of frames, the third frame rate including a higher frame rate when the amount of calculated motion is greater than a motion threshold and the third frame rate including a lower frame rate when the amount of calculated motion is less than the motion threshold, the lower frame rate being lower than the higher frame rate; and
encode the set of frames at the third frame rate.

27. The at least one non-transitory computer-readable medium of claim 26, further comprising instructions stored thereon which, when executed by the one or more processors, cause the one or more processors to:
display the set of frames at a playback frame rate that is lower than the third frame rate determined for the set of frames, wherein displaying the set of frames at the playback frame rate that is lower than the third frame rate determined for the set of frames comprises producing a slow motion effect for the set of frames based on the third frame rate and the playback frame rate.

28. The at least one non-transitory computer-readable medium of claim 26, wherein determining the third frame rate for encoding a set of frames from the sequence of ordered frames in the buffer comprises at least one of determining a particular frame rate when the amount of motion comprises a first level of motion, determining a first different frame rate when the amount of motion comprises a second level of motion that is higher than the first level of motion, and determining a second different frame rate when the amount of motion comprises a third level of motion that is higher than the second level of motion, and wherein encoding the set of frames comprises at least one of encoding the set of frames at the particular frame rate when the amount of motion comprises the first level of motion, encoding the set of frames at the first different frame rate when the amount of motion comprises the second level of motion, and encoding the set of frames at the second different frame rate when the amount of motion comprises the third level of motion.

* * * * *